J. SCHWERTNER.
AUTOMATIC PLAYING INSTRUMENT.
APPLICATION FILED DEC. 30, 1909.

1,041,179.

Patented Oct. 15, 1912.

Witnesses:
John O. Gempler
Geo. M. Harris

Inventor
Joseph Schwertner
By his Attorneys
Kenyon & Kenyon

J. SCHWERTNER.
AUTOMATIC PLAYING INSTRUMENT.
APPLICATION FILED DEC. 30, 1909.

1,041,179.

Patented Oct. 15, 1912.

Witnesses:

Inventor
Joseph Schwertner
By his Attorneys
Kenyon & Kenyon

J. SCHWERTNER.
AUTOMATIC PLAYING INSTRUMENT.
APPLICATION FILED DEC. 30, 1909.

1,041,179.

Patented Oct. 15, 1912.

UNITED STATES PATENT OFFICE.

JOSEPH SCHWERTNER, OF NEW YORK, N. Y., ASSIGNOR, BY DIRECT AND MESNE ASSIGNMENTS, TO HEERWAGEN COMPANY, A CORPORATION OF NEW YORK.

AUTOMATIC PLAYING INSTRUMENT.

1,041,179.   Specification of Letters Patent.   Patented Oct. 15, 1912.

Application filed December 30, 1909. Serial No. 535,585.

*To all whom it may concern:*

Be it known that I, JOSEPH SCHWERTNER, a citizen of the United States, and a resident of New York, county of New York, and State of New York, have invented certain new and useful Improvements in Automatic Playing Instruments, of which the following is a specification.

My invention relates to improvements in automatic playing instruments and more especially to devices for producing at will solo effects in automatic piano players.

One object of my invention is to provide an improved arrangement of this class in which any note or any series of adjacent notes on the piano may be accentuated at the will of the operator and in which the volume of accentuating may be varied at the will of the operator; in which such accentuating may be accomplished without producing any sluggishness in the action of the remaining notes and in which the parts are constructed in such a simple and efficient manner that they are not liable to get out of order and act with greatest effectiveness.

Further objects, features and advantages will more clearly appear from the detailed description given below taken in connection with the accompanying drawings which form a part of this specification.

Referring to the drawings.

In order that the principles of my invention may be clearly ascertained and that those skilled in the art may readily construct a satisfactory apparatus embodying my invention, I will now describe in detail the specific apparatus which is illustrated in the drawings, which apparatus constitutes a preferred form of my invention.

Figure 1:
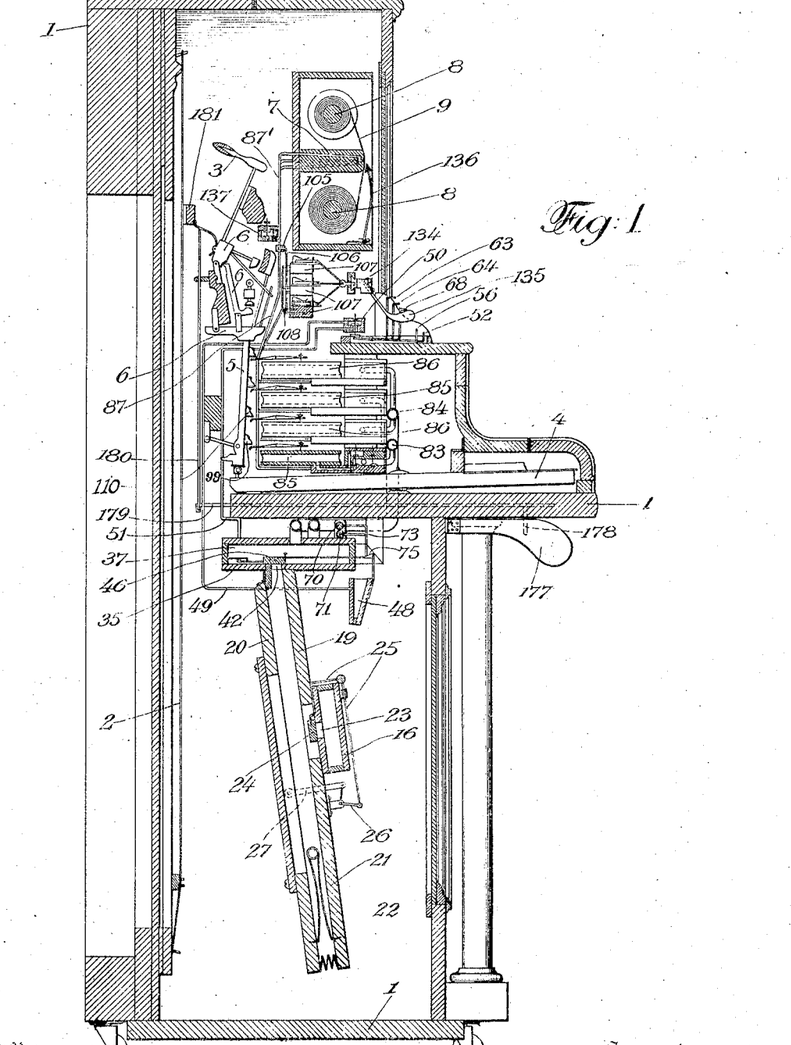
Figure 1 is a vertical cross-section of a piano player provided with one form of my improvements, certain parts being taken in section along the line I—I of Fig. 2.

Referring to Fig. 1, 1 represents the casing of a piano provided with the ordinary strings 2, hammers 3 of the piano action 6, keys 4, and members 5 for transmitting movement from the keys or pneumatics to the piano action. For automatically playing the piano it is provided with a suitable tracker 7 and rolls 8, 8 for carrying a suitable music sheet 9.

Figures 3, 5, 6, 7:
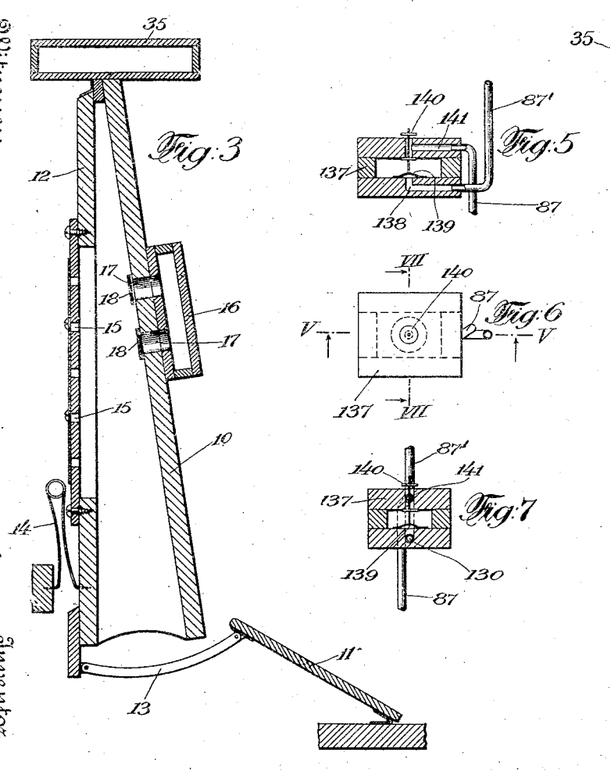
Fig. 3 is a vertical section of one of the pedals and operating bellows taken on the line III—III of Fig. 2.
Fig. 5 is a cross-section of one of the primary valves.
Fig. 6 is a top plan view of the same.
Fig. 7 is a sectional view of the same taken at right angles to Fig. 5.
Figure 4:
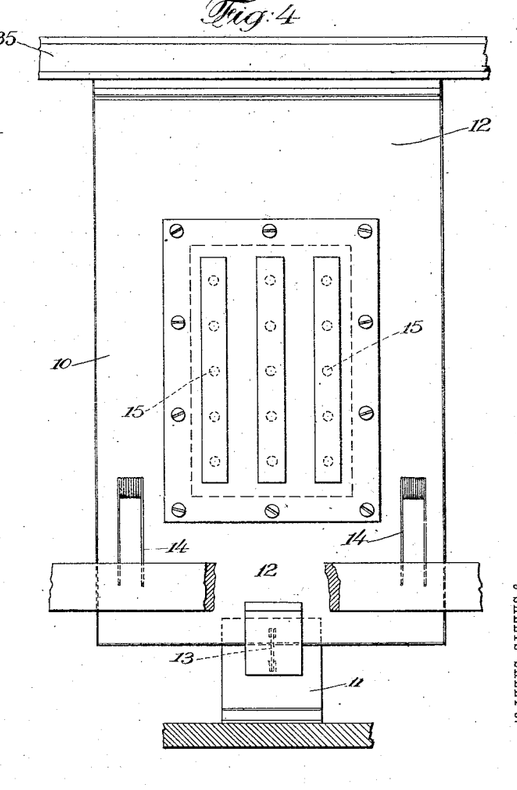
Fig. 4 is a rear view of the pedal and bellows shown in Fig. 3.
Figure 8:
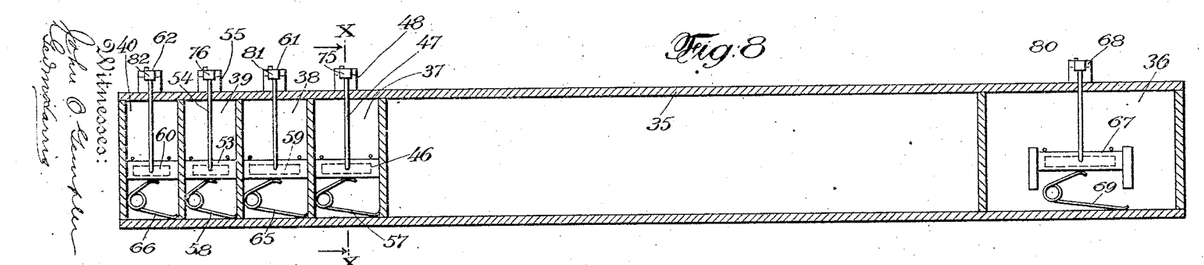
Fig. 8 is a horizontal section of the chamber in which different exhaustion compartments are situated, taken on the line VIII—VIII of Fig. 11.
Figure 9:
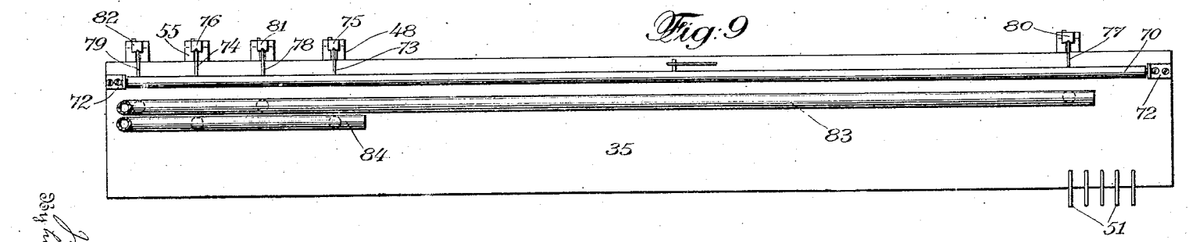
Fig. 9 is a top plan view of the same.
Figure 10:
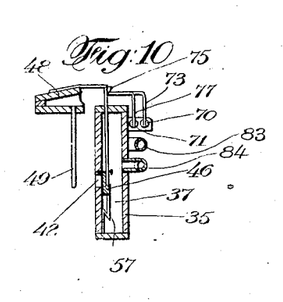
Fig. 10 is a cross-section taken on the line X—X of Fig. 8.
Figure 11:
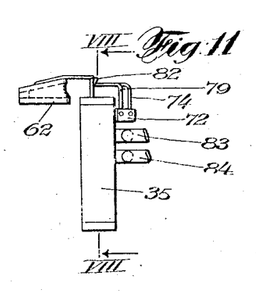
Fig. 11 is an end view of the parts shown in Fig. 8.
Figure 12:
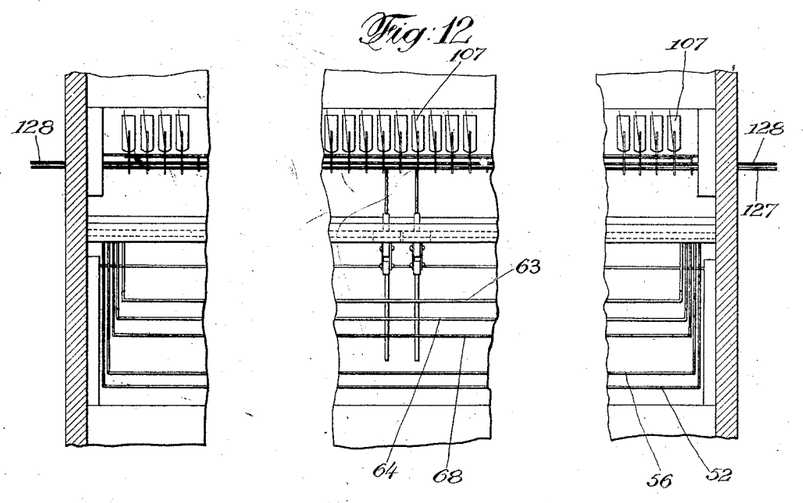
Fig. 12 is a top plan view of the valves for controlling the solo arrangement.

For operating the pneumatic devices which automatically operate the playing of the piano there are provided in the lower part of the case 1, two treadle bellows 10, 10. These treadle bellows are clearly shown in Fig. 2 and a cross-section and rear view of one of them are clearly shown in Figs. 3 and 4. The bellows are operated by the treadles 11 being actuated by the foot of the operator. The treadles 11 are connected with the movable side 12 of these bellows by means of a link 13. Springs 14 tend to maintain the bellows closed by forcing the movable side thereof up to the fixed side. As the treadles 11 are operated exhaustion is produced in the bellows 10, tending to produce a vacuum therein. For this purpose the movable side 12 is provided with suitable valve openings 15, 15. Lying in front and adjacent to the bellows 10, 10 is a suction or vacuum chamber 16. The suction or exhaustion chamber 16 is connected with the bellows 10, 10 by means of suitable openings 17, 17 and valves 18. At the right hand of the bellows 10 is a regulating bellows 19 clearly shown in cross-section in Fig. 1. The movable side 20 of this bellows is normally held away from the fixed side 21 thereof by means of spring 22. The bellows 19 is connected with the chamber 16 by means of an opening 23, so that upon exhaustion being produced in the chamber 16 exhaustion will be produced in the bellows 19 causing the same to collapse. Upon being collapsed to a certain point the opening 23 is closed by valve 24, operated by arm 25, which in turn is operated by bell crank lever 26, which bell crank lever is operated by a link 27 pivotally connected to the movable side 20 of the bellows. It will thus be seen that as the exhaustion within the bellows 19 is increased the link 27 moves the bell crank lever 26 to pull the valve 23 over the opening 24, so that the same becomes closed when a certain amount of suction has been produced within the bellows 19, the strength of the spring 22 determining the pressure in the bellows.

Figure 2:
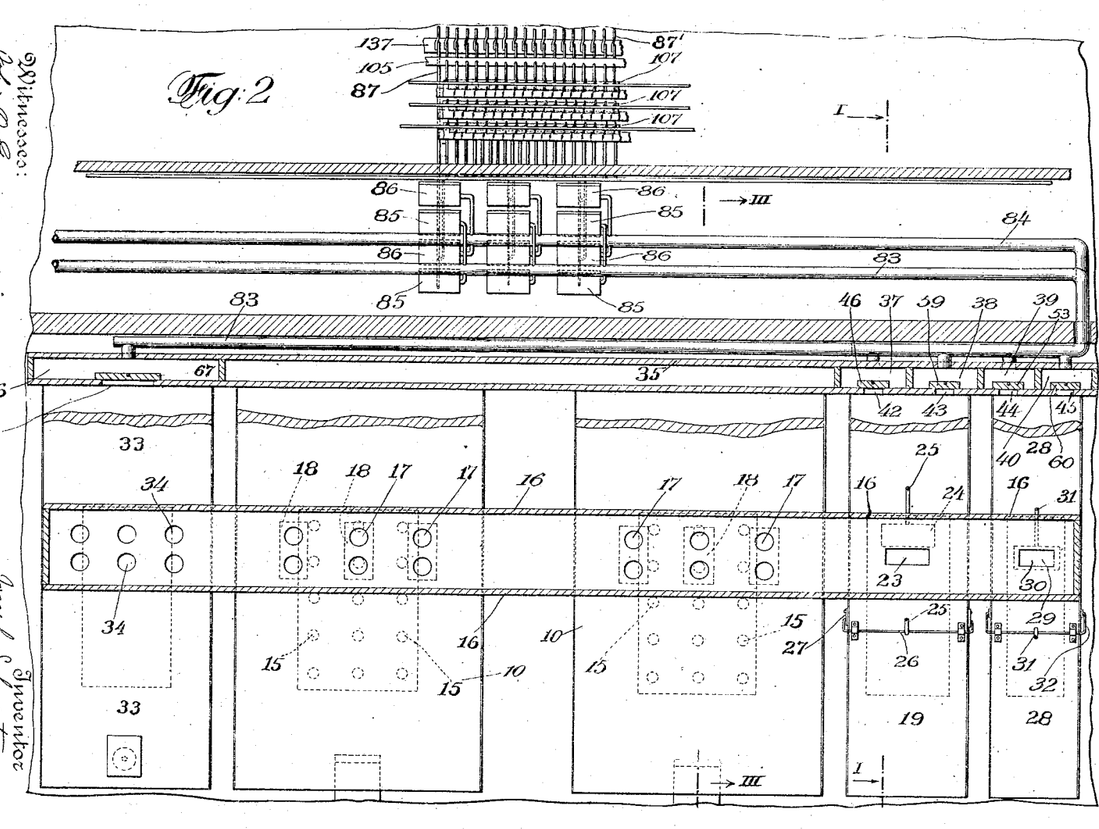
Fig. 2 is a front view of certain parts inside the casing of the piano, certain parts being broken away and shown in section in order to more clearly illustrate the operation thereof.

At the right of the bellows 19 is a similar but smaller regulating bellows 28 which is provided with an opening 29 connecting the same with the chamber 16 (see Fig. 2). A valve 30 is provided for closing this opening when the proper amount of suction has been produced therein, which suction however is designed to be less than the amount produced within the bellows 19. The valve 30 is operated in a similar manner to the valve 34 by means of a member 31, bell crank lever 32, etc. At the left hand of the treadle bellows 10 I provide still another regulating bellows 33 which is connected with the chamber 16 by means of openings 34. No valves are provided for closing the openings 34, and, therefore, the amount of exhaustion within the bellows 33 will be the same as that within the chest 16, while the exhaustion produced within the bellows 19 will be somewhat less than that within the chest 16 and the exhaustion within the bellows 28 will be less than that produced within the bellows 19.

Running along the top of the various bellows 10, 19, 28 and 33 is a chamber 35 provided with various suction or exhaustion compartments 36, 37, 38, 39 and 40. The compartment 36 is connected with the bellows 33 by an opening 41. The compartments 37 and 38 are connected with the bellows 19 by openings 42 and 43 respectively. The compartments 39 and 40 are connected with the bellows 28 by means of openings 44 and 45 respectively.

Within the compartment 37 there is a valve 46 arranged to close the opening 42, (see also Figs. 1, 8, 9, 10 and 11). The valve 46 is arranged to close the opening 42 by means of an arm 47 which is operated by causing the atmosphere to be exhausted from a pneumatic 48. The atmosphere is exhausted from the pneumatic 48 through a conduit 49 which leads to a pneumatic valve 50, (see Fig. 1). From the valve 50 connection is made with the high tension compartment 36 by means of a conduit 51. The valve 50 is opened by pressing a lever 52 by the hand of the operator. It will, therefore, appear that by pressing down the lever 52 the valve 50 is opened, so that the tube 49 is connected with the high tension bellows, thus causing the bellows 48 to collapse and moving the valve 46 from aperture 42, so that the medium tension is exerted within the chamber 37. In a similar manner the chamber 39 is provided with a valve 53 closing the aperture 44. This valve is operated by a link 54 connected with a bellows 55 in exactly the same way as the valve 46. The bellows 55 is connected with an automatic valve exactly the same as the valve 50, (Fig. 1) behind the valve 50 and operated in exactly the same manner by a lever 56. Springs 57 and 58 are arranged to normally return the valves 46 and 53 to close the openings 42 and 44. In a similar manner the compartments 38 and 40 are provided with valves 59 and 60 which are arranged to close the openings 43 and 45 respectively. These valves are operated by pneumatics 61 and 62 which are controlled in the same manner by valves similar to 50, which valves are operated manually by levers 63 and 64 respectively (see Fig. 1). Springs 65 and 66 are arranged to hold these valves in a normally closed position. In exactly the same way the compartment 36 is provided with a valve 67 arranged to close the opening 41. The valve 67 is operated by pneumatic 68, which is connected to a pneumatic valve similar to the valve 50 which in turn is operated by a lever 68 (Fig. 1). Spring 69 tends to maintain the valve 67 in a position to normally close the opening 41.

Arranged just above the chamber or box 35 are two rods 70 and 71. These rods are pivoted in uprights 72 at each end of the chamber 35. Projecting outwardly and downwardly from the rod 70 are wire extensions 73 and 74, see Figs. 1, 9, 10 and 11. These extensions are arranged to slide over cam faces 75 and 76 respectively on the movable members of the pneumatics 48 and 55. When the pneumatic 48 is operated by pressing the lever 52 the cam face 75, in moving inwardly, moves the member 73, thus rotating the rod 70 and likewise raising the member 74. It will thus appear that if the valve 53 had been open it will now be returned to its closed position by means of the spring 58. As the bellows 48 collapses the member 73 slides over the edge of the cam face 75 until the member 73 drops down to the right hand of the same (Fig. 1), thus locking the valve 46 in an open position. If now it is desired to open the valve 53 it is only necessary to press down the lever 56 when the bellows 55 will operate to move the valve 53 away from the opening 44. In so doing, however, the wire extension 74 rides up over the cam face 76, thus rotating the rod 70 so that it lifts the wire extension 73 and allows the valve 46 to again return to its closed position. At the same time the wire extension 74 drops over behind the cam face 76, thus locking the valve 53 in an open position. In exactly the same manner the rod 71 is provided with wire extensions 77, 78 and 79, which are arranged to drop down behind the cam faces 80, 81 and 82 respectively, to maintain their valves in an open position when operated. It will thus be apparent that when any of the valves 59, 60 or 67 are operated, by the pressing of one of the handles 63, 64 or 68, that the rod 71 will operate to drop one of the extensions 79, 78 or 77, back of the same to hold the valve in an open position. At the same time any other of these valves which happens to be open will be closed because the rod 71 will be sufficiently raised, as described, so that any other of the extensions 79, 78 or 77 will be raised, thus allowing the other valves to close under the action of their respective springs. Also arranged above the chamber 35 are two tubes 83 and 84 which with the chests 67, 37, 38, 39 and 40 form wind chambers operatively connected with the striking pneumatic hereinafter described (see also Fig. 2.) Tube 83 is connected with the compartments 36, 38 and 40, as clearly shown in Figs. 2 and 9. The tube 84 is connected with the compartments 37 and 39 respectively. It will, therefore, appear that either the medium or low suction may be thrown into the tube 84, depending on whether the valve 46 or 53 is open. In a similar manner the high, medium or low suction may be thrown into the tube 83, depending on whether the valve 67, 59 or 60 is open.

Figure 13:
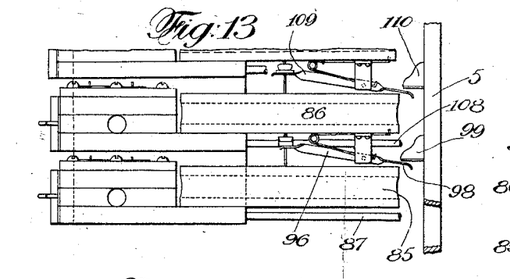
Fig. 13 is a side view of two of the power pneumatics.
Figure 14:
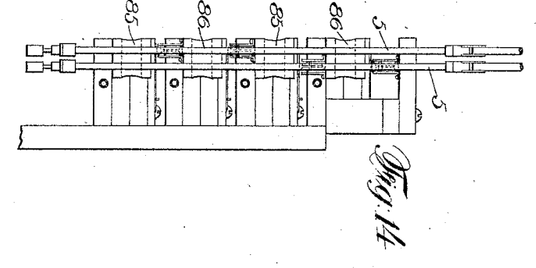
Fig. 14 is an end view of four of the power pneumatics.

Arranged above the keys 4 are power or striking pneumatics 85 and 86. There are two pneumatics 85 and 86 for each note respectively. There is shown in Fig. 1, one set of pneumatics 85, 86 arranged immediately above another set, in order to economize in space. The construction of these pneumatics will more clearly appear from a consideration of Figs. 13, 14 and 15. In the arrangement shown the pneumatic 85 is connected with the primary pneumatic 137 by means of a tube 87. This primary pneumatic is shown in detail in Figs. 5, 6 and 7. As the atmospheric pressure is admitted from the tracker 7 to the tube 87' it passes through the opening 138 and raises the diaphragm 139. This action raises the valve 140 so that atmospheric pressure is admitted to the tube 87 through the opening 141. The tube 87 ends its connection directly beneath the membrane 88 of the primary pneumatic 89, (see Fig. 15). When atmospheric pressure is admitted to the tube 87 through the valve 137 air passes down through the tube 87 and under the membrane 88. This raises the membrane 88 and also, at the same time raises the valve 89 which is connected thereto by means of a spindle 90. This connects the chamber 91 with the chamber 92 and the chamber 92 being subjected to suction or exhaustion thus produces exhaustion or suction within the pneumatic 85, causing the same to collapse. The chamber 91 is connected to the pneumatic 85 by means of a passageway 93, the ends of the pneumatic 85 consisting of suitable flexible material 94 so that the same will easily collapse. Upon the collapsing of the pneumatic 85 the lever arm 96 is drawn downwardly by means of pin 97 which is provided with adjusting nuts 95. This causes the other arm 98 of the lever to be forced upwardly so that it engages a projection 99 on the arm 5, thus raising the same and causing the note to be sounded, (see Fig. 13). The lever 96, 98 is pivoted at 100 and the spring 101 is arranged to return the pneumatic 86 to its original position after the note has been played.

Figure 15:
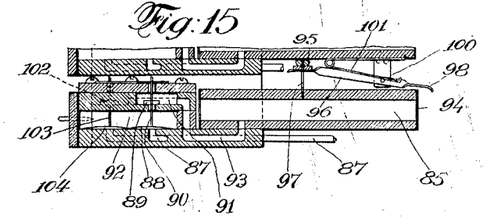
Fig. 15 is a vertical section of one of the power pneumatics.

Arranged behind the pneumatic 85 shown in Fig. 15 is another and similar pneumatic for another note and this is provided with the controlling valve 102, rod 103 and diaphragm 104. The chamber 92 is connected with the tube 83, and therefore the amount of suction within the chamber 92 may be varied in accordance with the variations of exhaustion or pressure within the tube 83, as above described. Referring again to Fig. 1, 105 represents a junction block from which leads a branch tube 106, the tube 106 being thus connected to the tube 87. Tube 106 leads to a suitable valve 116 from which leads a tube 108 which connects with the pneumatic 86 in exactly the same manner as the tube 87 connects with the pneumatic 85. It will thus be apparent that when the valve 116 is open that the tube 108 will be connected with the atmosphere upon the opening of the corresponding tracker duct, so that the pneumatic 86 will be caused to operate in exactly the same manner as the pneumatic 85. Pneumatic 86 operates a lever 109 which in turn engages a projection 110 on the same rod or part 5 with which the lever 98 engages. This action causes the same rod 5 to be actuated with increased force, this accenting the note as desired. The amount of force with which the pneumatic 86 operates may be varied, since each of the pneumatics 86 is connected with the tube 84 as clearly shown in Fig. 1.

In a similar manner the two upper pneumatics 85 and 86 are operated to raise a different member 5 corresponding to a different note, to operate the same.

Figure 16:
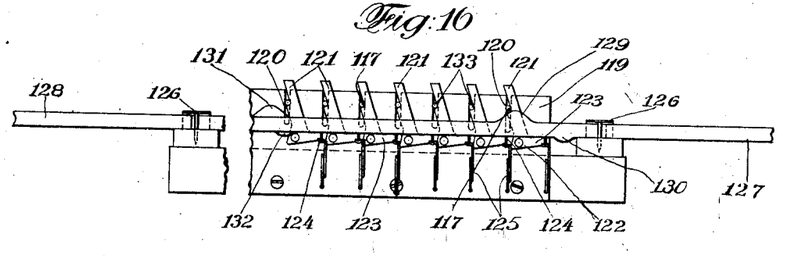
Fig. 16 is a detail view of a portion of the valves for controlling the solo arrangement and part of the operating mechanism therefor.
Figure 17:
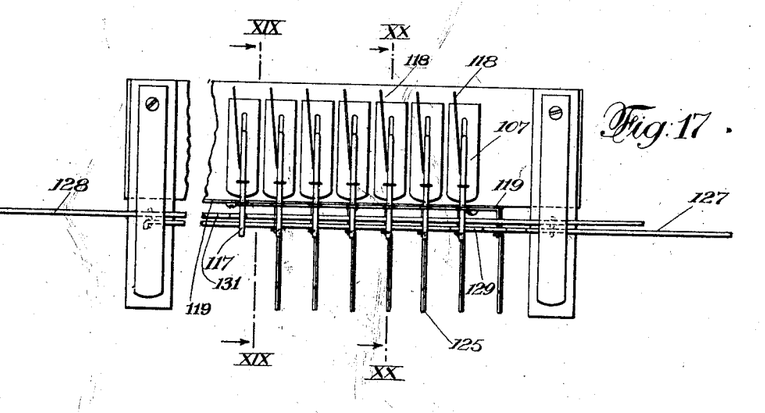
Fig. 17 is a top plan view of parts shown in Fig. 16.
Figures 18, 19:
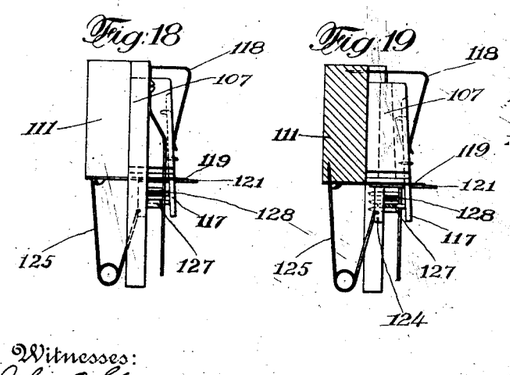
Fig. 18 is an end view of the arrangement shown in Figs. 16 and 17.
Fig. 19 is a section taken on the line XIX—XIX of Fig. 17.
Figure 20:
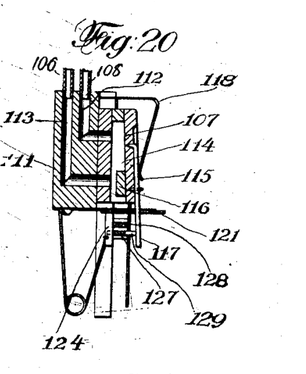
Fig. 20 is a section taken on the line XX—XX of Fig. 17.

Referring first to Fig. 1, there is a valve similar to 107 corresponding to each note. As shown in Fig. 1 these are stacked in three rows, one above another, each valve, however, being identical in its operation and construction. These valves which form independent means for rendering the accentuating pneumatics inoperative to be controlled by the tracker mechanism are more clearly shown in detail in Figs. 16 to 20 inclusive. In Figs. 16 and 17 a few of them only are shown. Figs. 18, 19 and 20 show a single valve in detail. Each valve consists of a block 111. Within this block are two passages 112 and 113 which connect with the tubes 108 and 106 respectively. The passages 112 and 113 connect with the chamber 114 and pivotally mounted on and forming the top of said chamber is a member 115 provided with a valve closure 116 which is arranged to close the opening 113 when in its lower position. Each of the pivotally mounted members 115 is provided with a wire extension 117, and a spring 118 tends to maintain the pivotally mounted member 115 closed so as to close the valve by closing the end of duct 113. Arranged in front of each row of valves 107 is a frame piece 119 provided with slots 120 through which the wire extensions 117 pass. (See Fig. 16). Pivoted to the frame piece 119 are a series of locking members 121, one for each valve. These locking members 121 are pivoted at 122 and provided with a laterally extending arm 123. The laterally extended arms 123 are also bent outwardly as at 124 where they are engaged by springs 125, so that the lateral arms 123 tend to rise. Sliding in suitable guideways 126 are two rods or hand operated movable members 127 and 128. Rod 127 is provided with a cam 129 on its upper surface and a cam 130 on its lower surface, while the rod 128 is provided with a cam 131 on its upper surface and the cam 132 on its lower surface. If the rod 127 be moved to the left the cam 129 will pass under the extension 117 thereby raising the same. When, however, the cam 130 of the rod 127 reaches the laterally and outwardly extending portion 124 of the members 121 it engages the same, forcing the same downwardly. This forces the upper portion of the member 121 to the right thus moving it out of the path of the extension 117 which has up to this time been held up by a notch 133, in the member 121. This allows extension 117 and its member 115 to drop down under the action of spring 118 thus closing the valve 116. Thus as the rod 127 is moved to the left it will close every valve behind it. If, however, the rod 127 be now moved back again to the right the cam 129 will raise each of the members 117 as it passes thereunder and will force them upwardly, so that they will engage within the notches 133. The springs 125 force the arms 124 upwardly, thus forcing the upper portions of the members 121 to properly engage the members 117 so as to hold the valves in open position. In this movement the cam 130 is so arranged and so spaced upon the rod 127 that it has already passed over the extension 124 on the members 121 when the cam 129 is in position to act. In a similar manner, as the cam 131 on the rod 128 passes to the left under the extensions 117 it leaves them as shown in Fig. 16. But as this rod is passed to the right the cam 132 engages the outwardly extending portions 124 so that the members 121 are rocked about their pivots, thus throwing the extensions 117 out of the notches 133 and allowing the valves to close. That is, when the rod 128 is reversed and moved back to the right, the cam 131 successively lifts each rod 117 out of its notch 133 and holds it until the cam 132 has depressed each portion 124 and tilted the arm 121, when the cam 131 allows the rod 117 to drop to its lowermost position. It will thus appear that as the cams 129 and 131 are moved toward one another the valves behind them will be closed and when the cams 129 and 131 are directly opposite each other either none or only one of the valves 107 is open. That is, from a consideration of Fig. 16, it will be clear that as the cams 129 and 130 are moved together they will reach a point where one will be directly behind the other, or, in other words, they will be opposite one another. Under these conditions if the apex of each cam lies between any two of the members 117, none of the valves will be open, but if the apex lies directly under one of the members 117, the corresponding valve will be open, and that one only. As the cams are moved away from one another by movement of the rods 127, 128, all of the valves between the cams 129 and 131 will be open, thus causing all the corresponding actions and respective sound-producing devices to be operated with increased force.

As shown in Fig. 1, each bank of valves 107 is provided with separate set of rods 127, 128, the rods 127 being mechanically connected together, however, as are also the rods 128. As shown the rods 127 are mechanically connected to the movable slide 130 piece 134, which slide piece is controlled by a handle 135. Rods 128 are controlled by a similar slide piece and handle 135. It will be apparent that by moving the handles 135 farther apart or nearer together at different portions of their length of travel that any one or more notes of the piano may be so included that they will be accented because their respective valves 107 are open. Pointers 136 are arranged to be connected to each of the sliding pieces 134 so that the particular notes being accented may be indicated upon the tracker sheet 9. The front view of a portion of the three rows of valves 107 may also be seen in Fig. 2.

Figure 21:
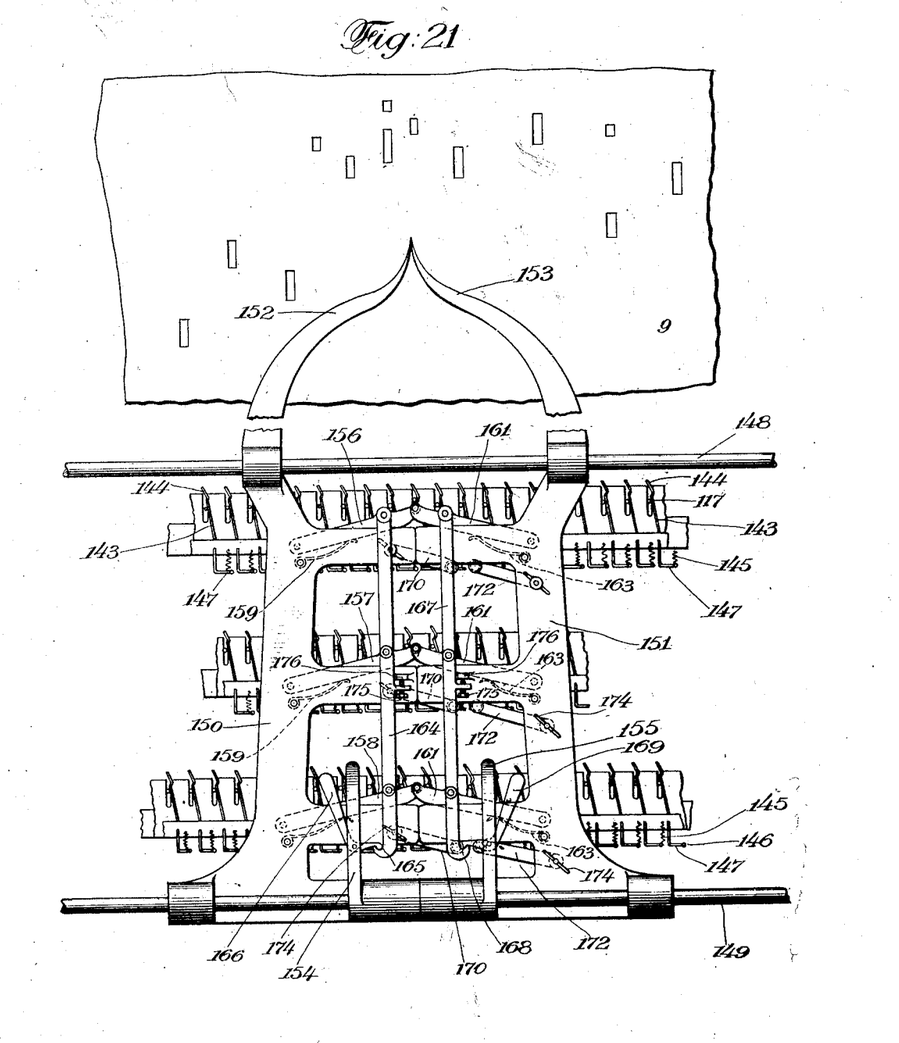
Fig. 21 is a front view of a modified form of arrangement for operating the valves controlling the solo arrangement.
Figure 22:
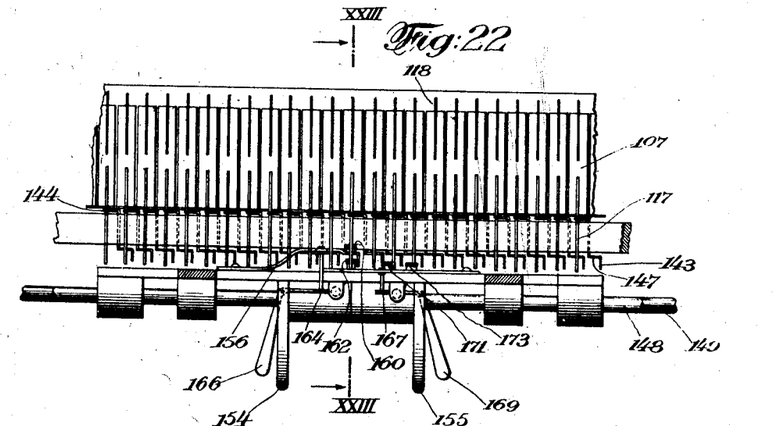
Fig. 22 is a top plan view of the same, certain parts being broken away.
Figure 23:
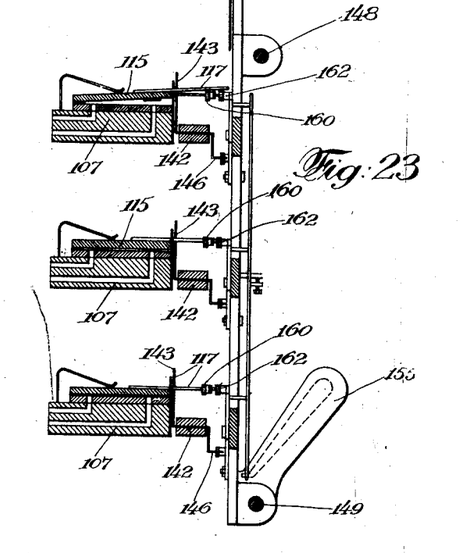
Fig. 23 is a vertical section of the same taken on the line XXIII—XXIII of Fig. 22.

In the modification shown in Figs. 21, 22 and 23, which modification I prefer, I provide a different means for operating the various valves 107. As shown in these figures I still provide three rows of valves 107. In front of each row extends a member 142. Extending through the members 142 is a series of wires 143 which are bent in a similar shape and arranged to take the place of the pivoted members 121 shown in Fig. 16. Wire members 143 are provided with bent portions 144 at their upper extremities which are arranged to engage and lock in their upper positions the wire extensions 117 of the valve members 115. Springs 145 tend to maintain the members 143 in a position to lock the members 117 in their upper positions. The members 143 are provided with portions 147 which extend to the right and outwardly extending portions 146. Instead of providing rods 127 and 128, however, with their cam faces, I provide, extending partway across the front of the piano below the music sheet 9, two rods 148 and 149. Slidably mounted upon the rods 148 and 149 are two members 150 and 151 provided with pointers 152 and 153 respectively which are arranged to perform functions similar to the pointers 136 above mentioned. The members 150 and 151 are provided with handles 154 and 155 respectively, integral therewith. Pivotally mounted upon the member 150 are three arms 156, 157 and 158, one for each of the three rows of valves. Springs 159 tend to maintain these members in their uppermost position. On the opposite ends from which these members are pivoted, arms 156, 157 and 158 carry rollers 160, (see Figs. 22 and 23). The rollers 160 are arranged to perform the same functions as the cam faces 131, (see Fig. 16) and in the same way. In a similar manner the member 151 is provided with pivoted arms 161 which carry upon their ends opposite to that at which they are pivoted, rollers 162, which are arranged to perform the same functions as the cam faces 129 of Fig. 16, and in the same way. Springs 163 are arranged to maintain the arms 161 in their uppermost positions. The arms 156, 157 and 158 are linked together by means of a link 164. The lower end of this link 164 is provided with a notch 165 and pivotally mounted on the handle 154 is a lever 166 which is arranged to engage the notch 165. When the lever member 166 is moved so that it will tend to lie parallel with the handle 154 the link 164 is drawn downwardly, thus drawing the arms 156, 157 and 158 and the rollers 160 downwardly so that they are withdrawn from operation. In a similar manner the arms 161 are connected together by a link 167 which is provided with a notch 168 arranged to be engaged by a lever 169 pivotally mounted upon the handle 155. Upon movement of lever 169 the link 167, arms 161 and rollers 162 are drawn downwardly so that they are withdrawn from operation. Thus upon moving the levers 166 and 169 the rollers 160 and 162 may be withdrawn from operation and the members 150 and 151 may be moved about to any desired place without operating any of the valves 107. Mounted upon the member 150 are three arms 170 which carry rollers 171 which perform exactly the same functions as the cam faces 132, of Fig. 16, and in exactly the same way. Located upon the member 151 are three arms 172 which are provided with rollers 173 on their ends, which rollers are arranged to act and perform the same functions as the cam faces 130 shown in Fig. 16, and in exactly the same way. The position of the rollers 171 and 173 may be adjusted by adjusting the positions of the arms 170 and 172 by means of thumb nuts 174. The uppermost position of the arms 156, 157, 158, 161 and links 164 and 167 may be limited by set screws 175 which are arranged to engage projections 176 on the members 150 and 151.

It will thus be apparent that by the arrangement shown in Figs. 21, 22 and 23 I provide means by which the members which control the accentuation of the various notes, may be withdrawn from operation while the members are being adjusted from one position to another on the piano. That is, if it is desired to accent notes in the lower part of the keyboard of the piano this may be done by moving the pointers 152 and 153 to that part of the keyboard and separating them to accent those notes which it is desired to accent. If now it is desired to accent notes at the upper part of the keyboard without accenting those in between, this may be done by moving the pointers 152 and 153 to the corresponding part of the tracker sheet and then separating these pointers to accent those notes which it is desired to accent. Thus a note or set of notes may be selected and accented at one portion of the instrument and an independent note or set of notes may be selected at any other portion of the instrument to be accented simultaneously.

Since the operator's feet are occupied in the operation of the bellows I have provided means by which the loud and soft pedal arrangement may be operated by the knees of the operator. For this purpose members 177 are arranged opposite the knees of the operator, which members are arranged to actuate projections 178 to operate rods 179, (see Fig. 1). The operating of the rods 179 raises rods 180 to remove the damping devices 181 or to apply the softening devices, as the case may be.

Figure 24:
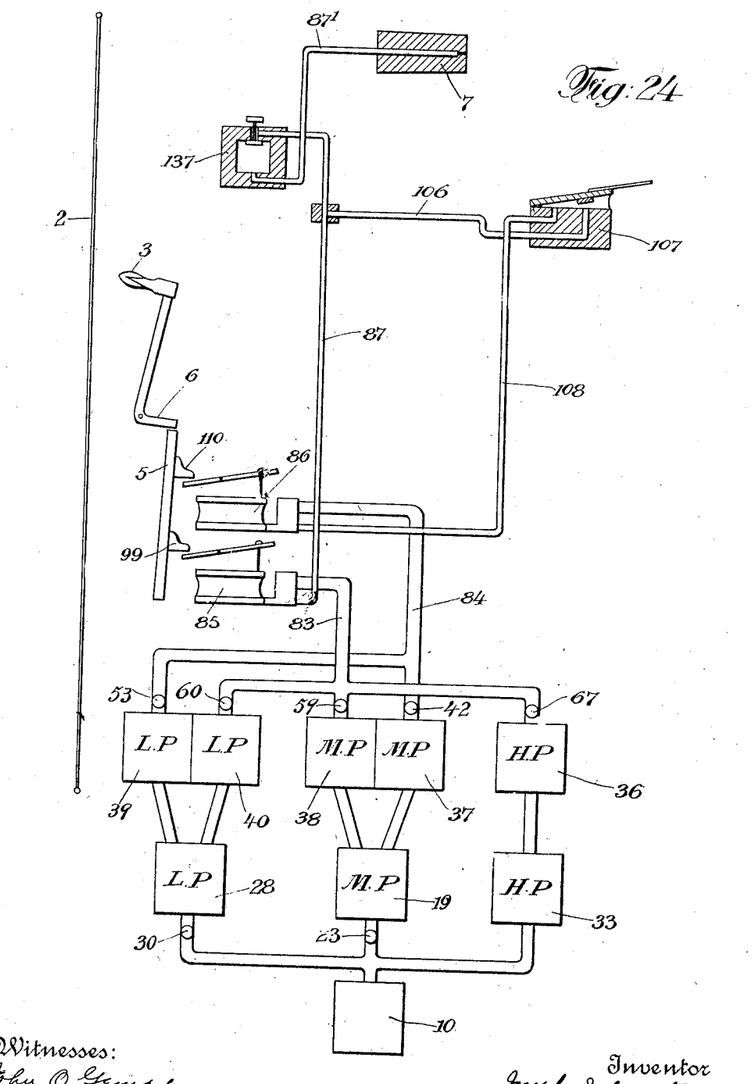
Fig. 24 is a diagrammatical view of certain parts which are intended to more clearly illustrate the operation thereof.

A general summary will make the operation of the devices clear. The operation of certain parts will probably be more clear from a consideration of Fig. 24, which shows certain of the parts in a diagrammatical arrangement. In this figure the treadle bellows are indicated by the square marked 10, which has connection with suitable exhaustion chambers 19, 28 and 33. In the connections with the chambers 19 and 28 there are valves 24 and 30 which cut off the exhaustion from these chambers when it has reached a certain point, thus producing a low pressure in the chamber 28 and medium pressure in the chamber 19, while the greatest exhaust is in the chamber 33. The automatic operation of these valves has already been described, and the various chambers are also designated L, P, M, P, and H, P respectively. The low pressure chamber connects with two other compartments or chambers 39 and 40, while the medium pressure chamber connects with two other compartments 37 and 38, producing the corresponding pressures in these compartments which are marked respectively, L, P, M, P and H, P. Connected with the compartments 37 and 39 is the tube 84 and in the connection thereto are valves 42 and 53. In a similar manner the tube 83 is connected with the compartments 36, 38 and 40, there being in each connection a valve 67, 59 and 60 respectively. These valves are so controlled as above described, that only one of each set can be open at a time, thus allowing any one of the various pressures to be produced in the tube 83 or the tube 84, at will. When an aperture in the tracker sheet 9 comes opposite an opening in the tracker, atmospheric air is admitted to the tube 87'. This actuates the valve 137 whence atmospheric air is admitted to the tube 87 which leads to one of the secondary diaphragms of pneumatics 85. This pneumatic is thus operated whence its lever is actuated to raise the member 5, thus playing the corresponding note. If it is desired to accent this note as distinguished from the other notes it is only necessary to include the same between pointers 136, or 152 and 153, which coöperate with the tracker mechanism to indicate the note included, when the valve 107 corresponding to this note will be opened, thus admitting atmospheric air to the pneumatic 86 through the tubes 106 and 108, which thus acts to add its force to the operation of the member 5 and the note corresponding thereto. If the pointers 136 are moved so as to include several notes therebetween each one of these several notes will be accented in the same manner when it is played in response to the opening thereto on the tracker sheet.

The amount of accentuation of the notes may be varied at the will of the operator by the operation of the levers 52 and 56. By pressing down either one or the other levers 52 or 56 the solo notes of the piano may be struck with more or less force. This is done by throwing either the medium or low suction into the tube 84 as above described. It will be understood, however, that the sound producing devices are actuated by the pneumatics 86 in addition to the pneumatics 85 when the notes are accented. However, the sound producing devices may be given different effects by varying the amount of suction or pressure used in the pneumatics 85 when operating alone, or it may be stated as follows. The amount of accentuation of the remaining notes or accompaniment may be also varied in a like manner by throwing either the high, low or medium pressures into the tube 83 by operating one of the levers 63, 64, or 68. Only one of the valves 67, 59 or 60 and one of the valves 46 or 53 can be opened at once because of the locking and releasing action of the rods 70 and 71 and their wire extensions 73, 74, 77, 78 and 79.

From the above it will be clear that any note or notes may be selected at the will of the operator from the music sheet and accented to any desired degree. At the same time the accompaniment or notes on the piano may be played with any desired amount of force.

By providing separate pneumatics for accenting each note the accentuation is rendered much more effective and no sluggish action occurs which has been found to occur where the same pneumatic was used for the accompaniment as for the accentuation.

It will be apparent that many of my improvements are applicable to many structures other than those I have shown. A pressure system may obviously be substituted for an exhaust system. My particular novel arrangement of valves 107 and ducts 87 and 108 may be readily found applicable for other uses than their use as specifically described in this application. They may be advantageously used for coupling up one or more pneumatics with another or one set of pneumatics with another at the will of the operator, in any desired manner. As shown in this case the valves 107 are arranged to open the ducts 87, 108, so that the sets of pneumatics 85 and the set of pneumatics 86 are suitably connected so that when the devices of one set are operated the devices of the other set may be operated.

Although I have described my improvements in great detail nevertheless I do not desire to be limited to such details except as specified hereinafter in the claims, since many modifications and changes may be made within the spirit and scope of my invention. But Having fully and clearly described my improvements what I claim as new and desire to secure by Letters Patent is:

1. In a musical instrument, the combination of means for causing each note to be sounded, a set of striking pneumatics, one for each note, arranged to mechanically act on said means when the note is to be sounded, a second set of striking pneumatics, one for each note, arranged to mechanically act on said means when the note is to be accented, a high pressure reservoir, a medium pressure reservoir and a low pressure reservoir, means for operatively connecting any one of said reservoirs into operative relation with said first set of pneumatics whereby the first set of pneumatics may be operated with different pressures at will, and means for operatively connecting either of said first two mentioned reservoirs into operative relation with said second set of pneumatics whereby the second set of pneumatics may be operated with different pressures at will.

2. In a musical instrument, the combination of means for causing each note to be sounded, a set of striking pneumatics, one for each note, arranged to mechanically act on said means when the note is to be sounded, a second set of striking pneumatics, one for each note, arranged to mechanically act on said means when the note is to be accented, a high pressure reservoir, a medium pressure reservoir and a low pressure reservoir, means for operatively connecting either of said last two mentioned reservoirs into operative relation with said first set of pneumatics whereby said first set of pneumatics may be operated with medium or low pressure, at will, and means for operatively connecting either of said first two mentioned reservoirs into operative relation with said second set of pneumatics whereby said second set of pneumatics may be operated under high or medium pressure, at will.

3. In a musical instrument, the combination of means for causing each note to be sounded, a set of striking pneumatics, one for each note, arranged to mechanically act on said means when the note is to be sounded, a second set of striking pneumatics, one for each note, arranged to mechanically act on said means when the note is to be accented, a high pressure reservoir, a medium pressure reservoir and a low pressure reservoir, means for operatively connecting said first set of pneumatics with the last mentioned reservoir whereby it may operate under low pressure, and means for operatively connecting said second set of pneumatics with either of said first two reservoirs whereby the second set of pneumatics may be operated with high or medium pressure to vary the amount of accenting.

4. In a musical instrument, the combination of means for causing each note to be sounded, a set of striking pneumatics, one for each note, arranged to mechanically act on said means when the note is to be sounded, a second set of striking pneumatics, one for each note, arranged to mechanically act on said means when the note is to be accented, a high pressure reservoir, a medium pressure reservoir and a low pressure reservoir, means for operatively connecting one of said sets of pneumatics with one of said reservoirs, whereby it may operate under the pressure of that reservoir, and means for operatively connecting the other set of pneumatics with either of the other reservoirs, whereby the said other set of pneumatics may be operated with different pressures.

5. In a musical instrument the combination of a plurality of note sounding devices, a striking pneumatic for each note for accompaniment playing, a striking pneumatic for each note for accentuated playing, a wind chamber operatively connected with said first mentioned pneumatics, an independent wind chamber operatively connected with said second mentioned pneumatics, three regulating bellows, two of which are operatively connected with one chamber, and three of which are operatively connected with the other chamber, whereby the pressure in each chamber may be varied, and valves for opening and closing the connections between the bellows and the chambers.

6. In a musical instrument the combination of a plurality of note sounding devices, a striking pneumatic for each note for accompaniment playing, a striking pneumatic for each note for accentuated playing, a wind chamber operatively connected with said first mentioned pneumatics, an independent wind chamber operatively connected with said second mentioned pneumatics, a plurality of regulating bellows, a plurality of said regulating bellows being operatively connected to the first chamber, and a plurality of said bellows being operatively connected to the second chamber, whereby the pressure in each chamber may be varied, and valves for opening and closing the connections between the chambers and the bellows.

7. In a musical instrument the combination of a plurality of note sounding devices, a striking pneumatic for each note for accompaniment playing, a striking pneumatic for each note for accentuated playing, a wind chamber operatively connected with said first mentioned pneumatics, an independent wind chamber operatively connected with said second mentioned pneumatics, a plurality of regulating bellows operatively connected with said second chamber, whereby the pressure in said second chamber may be varied, and valves for opening and closing the connections between said bellows and said second chamber, means for exhausting said bellows, tracker mechanism for controlling the operation of the striking pneumatics and independent means for rendering each of said accentuating pneumatics inoperative to be controlled by the tracker mechanism.

8. In a musical instrument the combination of a plurality of note sounding devices, a striking pneumatic for each note for accompaniment playing, a striking pneumatic for each note for accentuated playing, a wind chamber operatively connected with said first mentioned pneumatics, an independent wind chamber operatively connected with said second mentioned pneumatics, three regulating bellows, two of which are operatively connected with one chamber and three of which are operatively connected with the other chamber whereby the pressure in each chamber may be varied, and valves for opening and closing the connections between the bellows and the chambers, means for exhausting said bellows, tracker mechanism for controlling the operation of the striking pneumatics, independent means for rendering each of said accentuating pneumatics inoperative to be controlled by the tracker mechanism, and two relatively movable hand operated members for controlling said independent means to determine the particular accentuating pneumatics to be made responsive to the tracker mechanism, each of said hand operated members carrying an indicating pointer coöperating with the tracker mechanism.

9. In a musical instrument the combination of a plurality of note sounding devices, a striking pneumatic for each note for accompaniment playing, a striking pneumatic for each note for accentuated playing, means for causing each of said accentuating pneumatics to operate with a plurality of different pressures, tracker mechanism for controlling the operation of the striking pneumatics, and independent means for rendering each of said accentuating pneumatics inoperative to be controlled by the tracker mechanism.

10. In a musical instrument the combination of a plurality of note sounding devices, a striking pneumatic for each note for accompaniment playing, a striking pneumatic for each note for accentuated playing, means for causing each of said accentuating pneumatics to operate with three different pressures, tracker mechanism for controlling the operation of the striking pneumatics, independent means for rendering each of said accentuating pneumatics inoperative to be controlled by the tracker mechanism, and two relatively movable hand operated members for controlling said independent means to determine the particular accentuating pneumatics to be made responsive to the tracker mechanism, each of said hand operated members carrying an indicating pointer coöperating with the tracker mechanism.

11. In a musical instrument the combination of a plurality of note sounding devices, a striking pneumatic for each note for accompaniment playing, a striking pneumatic for each note for accentuated playing, means for causing each of said accentuating pneumatics to operate with different pressures, means for causing each of the accompaniment pneumatics to operate with different pressures, tracker mechanism for controlling the operation of the striking pneumatics, independent means for rendering each of said accentuating pneumatics inoperative to be controlled by the tracker mechanism, and two relatively movable hand operated members for controlling said independent means to determine the particular accentuating pneumatics to be made responsive to the tracker mechanism, each of said hand operated members carrying an indicating pointer coöperating with the tracker mechanism.

12. In a musical instrument the combination of a plurality of note sounding devices, a striking pneumatic for each note for accompaniment playing, a striking pneumatic for each note for accentuated playing, a wind chamber operatively connected with said first mentioned pneumatics, an independent wind chamber operatively connected with said second mentioned pneumatics, three regulating bellows, two of which are operatively connected with one chamber, and three of which are operatively connected with the other chamber, whereby the pressure in each chamber may be varied, and valves for opening and closing the connections between the bellows and the chambers, means for exhausting said bellows, tracker mechanism for controlling the operation of the striking pneumatics, independent means for rendering each of said accentuating pneumatics inoperative to be controlled by the tracker mechanism, and two relatively movable hand operated members for controlling said independent means to determine the particular accentuating pneumatics to be made responsive to the tracker mechanism, each of said hand operated members carrying an indicating pointer coöperating with the tracker mechanism, and a plurality of hand operated members adjacent said two hand operated movable members, one for controlling each of said valves.

13. In a musical instrument, the combination of means for causing each note to be sounded, a set of striking pneumatics, one for each note, arranged to mechanically act on said means when the note is to be sounded, a second set of striking pneumatics, one for each note, arranged to mechanically act on said means together with the corresponding pneumatics of the first set when the note is to be accented, a high pressure reservoir, a medium pressure reservoir and a low pressure reservoir, means for operatively connecting either of said last two mentioned reservoirs into operative relation with said first set of pneumatics whereby said first set of pneumatics may be operated with medium or low pressure at will, and means for operatively connecting either of said first two mentioned reservoirs into operative relation with said second set of pneumatics whereby said second set of pneumatics may be operated under high or medium pressure at will.

14. In a musical instrument, the combination of means for causing each note to be sounded, a set of striking pneumatics, one for each note, arranged to mechanically act on said means when the note is to be sounded, a low pressure reservoir and means for operatively connecting it with said pneumatics whereby they may be exhausted thereby, a second set of striking pneumatics, one for each note, arranged to mechanically act on said means when the note is to be accented, a variable pressure wind trunk, and means for operatively connecting said second set of pneumatics with said wind trunk whereby the second set of pneumatics may be operated with different pressures to vary the amount of accenting.

In testimony whereof, I have signed my name to this specification, in the presence of two subscribing witnesses.

JOSEPH SCHWERTNER.

Witnesses:
GORHAM CROSBY,
EDWIN SEGER.

---

Corrections in Letters Patent No. 1,041,179.

It is hereby certified that in Letters Patent No. 1,041,179, granted October 15, 1912, upon the application of Joseph Schwertner, of New York, N. Y., for an improvement in "Automatic Playing Instruments," errors appear in the printed specification requiring correction as follows: Page 3, lines 77–78, for the words "primary pneumatic" read *valve;* same page, line 80, for the word "valve" read *primary pneumatic;* page 4, line 38, after the word "valve" insert the reference-numeral *116;* and that the said Letters Patent should be read with these corrections therein that the same may conform to the record of the case in the Patent Office.

Signed and sealed this 10th day of December, A. D., 1912.

[SEAL.]

C. C. BILLINGS,

*Acting Commissioner of Patents.*